(12) United States Patent
Tao

(10) Patent No.: US 7,438,248 B2
(45) Date of Patent: Oct. 21, 2008

(54) MODULARIZED FISHING REEL SPOOL

(75) Inventor: Ning Tao, Shanghai (CN)

(73) Assignee: Haiyan Zhang, Shanghai (CN)

( * ) Notice: Subject to any disclaimer, the term of this patent is extended or adjusted under 35 U.S.C. 154(b) by 0 days.

(21) Appl. No.: 11/942,765

(22) Filed: Nov. 20, 2007

(65) Prior Publication Data
US 2008/0093492 A1    Apr. 24, 2008

Related U.S. Application Data

(63) Continuation of application No. PCT/CN2006/000327, filed on Mar. 6, 2006.

(51) Int. Cl.
*A01K 89/01* (2006.01)
(52) U.S. Cl. .................. 242/246; 242/322
(58) Field of Classification Search .......... 242/246, 242/322
See application file for complete search history.

(56) References Cited

U.S. PATENT DOCUMENTS

| | | | | |
|---|---|---|---|---|
| 4,938,433 A | * | 7/1990 | Toda | 242/245 |
| 4,951,897 A | * | 8/1990 | Takeuchi | 242/246 |
| 5,322,238 A | * | 6/1994 | Hitomi | 242/246 |
| 6,286,772 B1 | * | 9/2001 | Koelewyn | 242/246 |
| 6,446,893 B2 | * | 9/2002 | Yamaguchi | 242/246 |
| 6,467,712 B1 | * | 10/2002 | Cribb | 242/322 |
| 6,655,622 B2 | * | 12/2003 | Kitajima et al. | 242/322 |
| 6,679,445 B2 | * | 1/2004 | Morise et al. | 242/322 |
| 6,766,975 B2 | * | 7/2004 | Yamaguchi | 242/246 |
| 6,769,639 B2 | * | 8/2004 | Koelewyn et al. | 242/246 |
| 6,971,601 B2 | * | 12/2005 | Sugawara | 242/307 |

* cited by examiner

*Primary Examiner*—Emmanuel M Marcelo
(74) *Attorney, Agent, or Firm*—Matthias Scholl P.C.; Matthias Scholl

(57) ABSTRACT

A modularized fishing reel spool comprises a drag adjust knob, a brake device having two springs and washer stacks, a front lid, a core and a skirt. A turning support system of the spool comprises a two bearing system, a main shaft and a core shaft. Compared to conventional fishing reel spools, this invention provides a spool having advantages such as better structural design, wider adjustable brake range, superior line-loading force application, well-functioned water drainer system, low manufacturing cost and lower material usage.

11 Claims, 7 Drawing Sheets

MODULARIZED FISHING REEL SPOOL

CROSS-REFERENCE TO RELATED APPLICATIONS

This application is a continuation of International Patent Application No. PCT/CN2006/000327 with an international filing date of Mar. 6, 2006, designating the United States, now pending, and further claims priority benefits to Chinese Patent Application No. 200520041709.2, filed on May 20, 2005. The contents of the aforementioned specifications are incorporated herein by reference.

BACKGROUND OF THE INVENTION

1. Field of the Invention

This invention relates to fishing reels, and more particularly to drag brake devices for use in fishing reels.

2. Description of the Related Art

A spool device is a part of a fishing reel. The main purpose of the spool is to store and release the fishing line. While the line winding device turns and winds the fishing line onto the spool neck, the spool device remains still. When the line is released, for example, being pulled by fish, the line winding device keeps still. While the fishing line is let out, the spool is turned by the line and continuously releases the line out. However, the line should not be released without tension. Specifically, it is beneficial to let fish feel certain resistance in order to prevent unhooking. The drag force will also exhaust the fish. However, the resistance cannot be too large; otherwise the line may fail. Accordingly, the spool has to provide an adjustable drag force.

A conventional fishing reel spool device is shown in FIG. 1. The spool device consists of a brake device 2, a turning support device, a drag adjust knob 1, and a main shaft 5 which passes through the spool. The spool device also consists of lid 31, core 32 and skirt 33. A concave section of core 32 serves to store the line.

Through central bore, the spool 3 is mounted at the front of the main shaft 5. The spool is freely rotatable on main shaft 5. The brake device 2 consists of a drag stack, a drag washer, a keyed washer, an eared washer all of which form multiple brake friction pairs in a cavity located at the front of the core 32. The drag adjust knob 1 is screwed on the main shaft 5 to form drag adjustable mechanism.

Referring to FIG. 1, when drag adjust knob 1 is turned clockwise, it is screwed into the main shaft. The more the knob is screwed in, the bigger the force applied through the coil spring to the drag stack will be. The force is converted into a brake torque acting on the drag stack. The brake torque is resisting the spool's 3 turning. While the above parts are utilized, the main shaft 5 remains still. When the knob 1 is screwed out of the main shaft, the spring becomes uncompressed, the drag force becomes zero, and so does the brake torque. The spool 3 is dragged out by fish without difficulty and the line is let out easily. The magnitude of the braking force depends mainly on the rigidity of the spring, the compress displacement of the spring, the material of the drag stacks, the friction coefficient, and the number of brake pairs.

However, a conventional fishing reel spool described above has the following disadvantages:

1) Due to the fact that spool 3 is made in one-piece, the fishing reel spool 3 can usually have only a relatively simple structure. Hence, the material consumption is large and the material cost high.

2) A single spring action limits the magnitude of brake resistance to the spool. The drag adjustable range is also limited.

3) The turning support mechanism, as shown in FIG. 2, has a cantilever support configuration since it needs to accommodate a cavity for installing a drag stack device. Therefore, the support length L1 becomes relatively short, and this affects its supporting performance.

4) The spool does not easily accommodate an outlet for water brought in with a wet line; water drains uncontrollably adversely affecting the fishing experience.

SUMMARY OF THE INVENTION

The modularized fishing reel spool of the invention is constructed with the goal of overcoming the above-described problems, i.e., to reduce the material cost, to enlarge the drag adjustable range, to improve the turning support mechanism, and to improve the draining function of fishing reels.

In certain embodiments of the invention, provided is a modularized fishing reel spool comprising a drag adjust knob, a brake device, a spool, a turning support device, and a main shaft.

In a class of this embodiment, the spool is formed by the front lid, the core having a cavity and skirt, which elements are connected to each other by a connecting element or a thread.

In a class of this embodiment, the main shaft has pin, and the front part of the main shaft is threaded. This main shaft is set in the bore on core shaft. The pin is embedded in the key slot on the flange of the core shaft.

In a class of this embodiment, the brake device is disposed in the middle of the cavity of the core and on the core shaft. From the back to the front, there are disposed a big spring, drag stacks, a small spring and a front lip.

In a class of this embodiment, the rigidity of the big spring is larger than the rigidity of the small spring.

In a class of this embodiment, the turning support device 4 comprises the second ball bearing between the skirt and the core shaft, the first ball bearing between the front lid and the front actuator. The turning support device keeps the spool constantly supported as a freely-supported beam.

In a class of this embodiment, the main shaft passes through the core shaft, the brake device and the turning support device; the central thread of the brake adjustable knob screws onto or into the thread of the main shaft; and the adjustable knob presses upon the front actuator.

In a class of this embodiment, the connecting element is a screw.

In a class of this embodiment, the core has more than one elongated water drainer for draining water.

In a class of this embodiment, at the end of the skirt disposed is one or more water drainers and/or through holes.

In a class of this embodiment, spline slots are disposed axially at the concave inside of the core.

In a class of this embodiment, the core shaft comprises a round hole; the shape of the core shaft is a regular polygon, and the back part of the core shaft expands to flanges. A pair of symmetrical flutes is disposed at the connecting area between the back side of the flange and the round hole.

In a class of this embodiment, the drag washer stack is assembled in the following order: (1) the keyed washer; (2) the drag washer, (3) the eared washer, (4) the drag washer, (5) the keyed washer, and so on.

In a class of this embodiment, the central hole of the keyed washer is a spline connected with the core shaft to form a non-rotating link.

In a class of this embodiment, the centre holes of the eared washer and the drag washer are round and the diameters of the holes are larger than the maximum diameter of polygonal section of the core shaft.

In a class of this embodiment, the ears of the eared washer are embedded into the spline slots inside of the core.

In a class of this embodiment, there is shim between the flange and the skirt.

In a class of this embodiment, the back part of the flange comprises a sound ratchet.

In certain embodiments, the reel spool of the invention comprises individually manufactured components such as front lid, core, and skirt. The core can be made from a drawn pipe, and little further machining is required. The skirt and the front lid can be punch pressed or drawn to form their shape with little machining required, therefore the cost is relatively low.

In certain embodiments, the reel spool of the invention comprises a two bearing turning support system. The support system allows for a wider bearing support span compared to conventional solutions. The working condition of the turning support is greatly improved, and it can achieve a higher line releasing speed.

In certain embodiments, the brake mechanism of this invention has a double action spring. It delivers wider and better defined drag adjusting range, and a larger, and smoother braking force than conventional solutions.

In certain embodiments, the reel spool of the invention comprises a water drainage structure on the core and the skirt of the spool. This structure allows for water brought back by wet fishing line to drain out.

In certain embodiments, the reel spool of the invention comprises a core shaft allowing for a simple construction. The core shaft be easily machined and remains in better mechanical condition throughout the lifetime of the reel.

DETAILED DESCRIPTION OF THE INVENTION

Hereinbelow is a further description of the embodiments of the invention with reference to drawings. The description is meant to be illustrative and not limiting.

Figure 1:
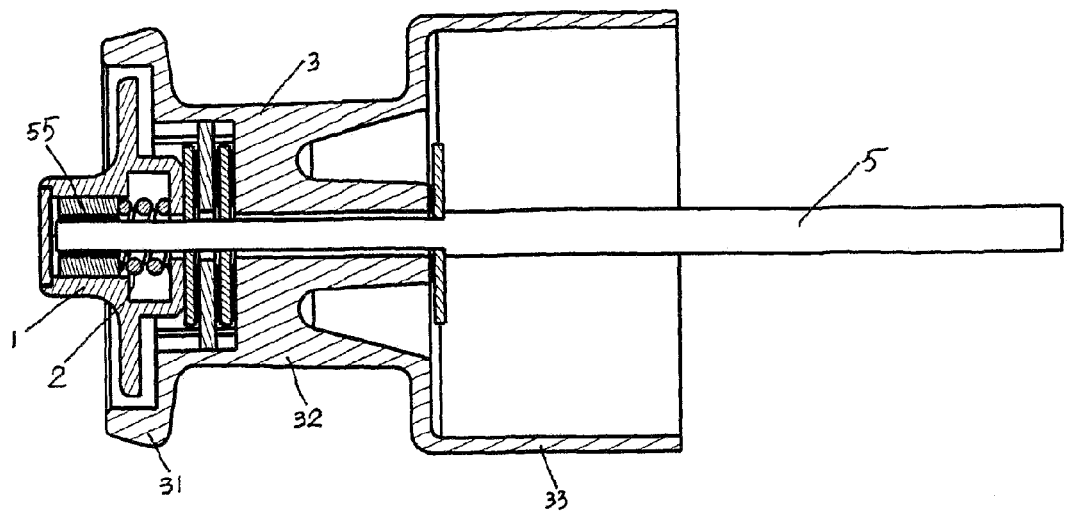
FIG. 1 shows a cross-sectional view of a fishing reel spool of prior art.
Figure 2:
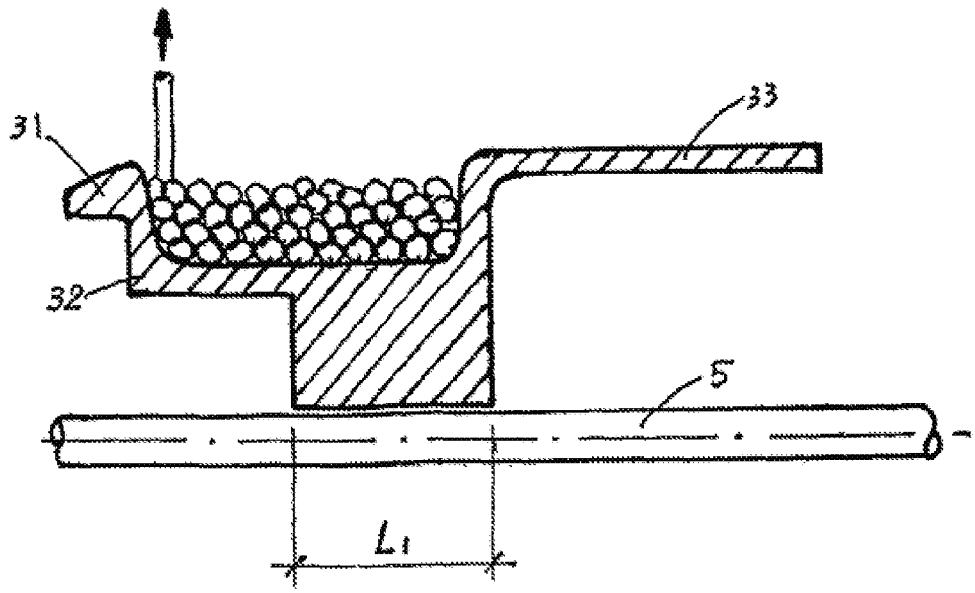
FIG. 2 shows a cross-sectional view of a turning support structure for a fishing reel spool of prior art.
Figure 3:
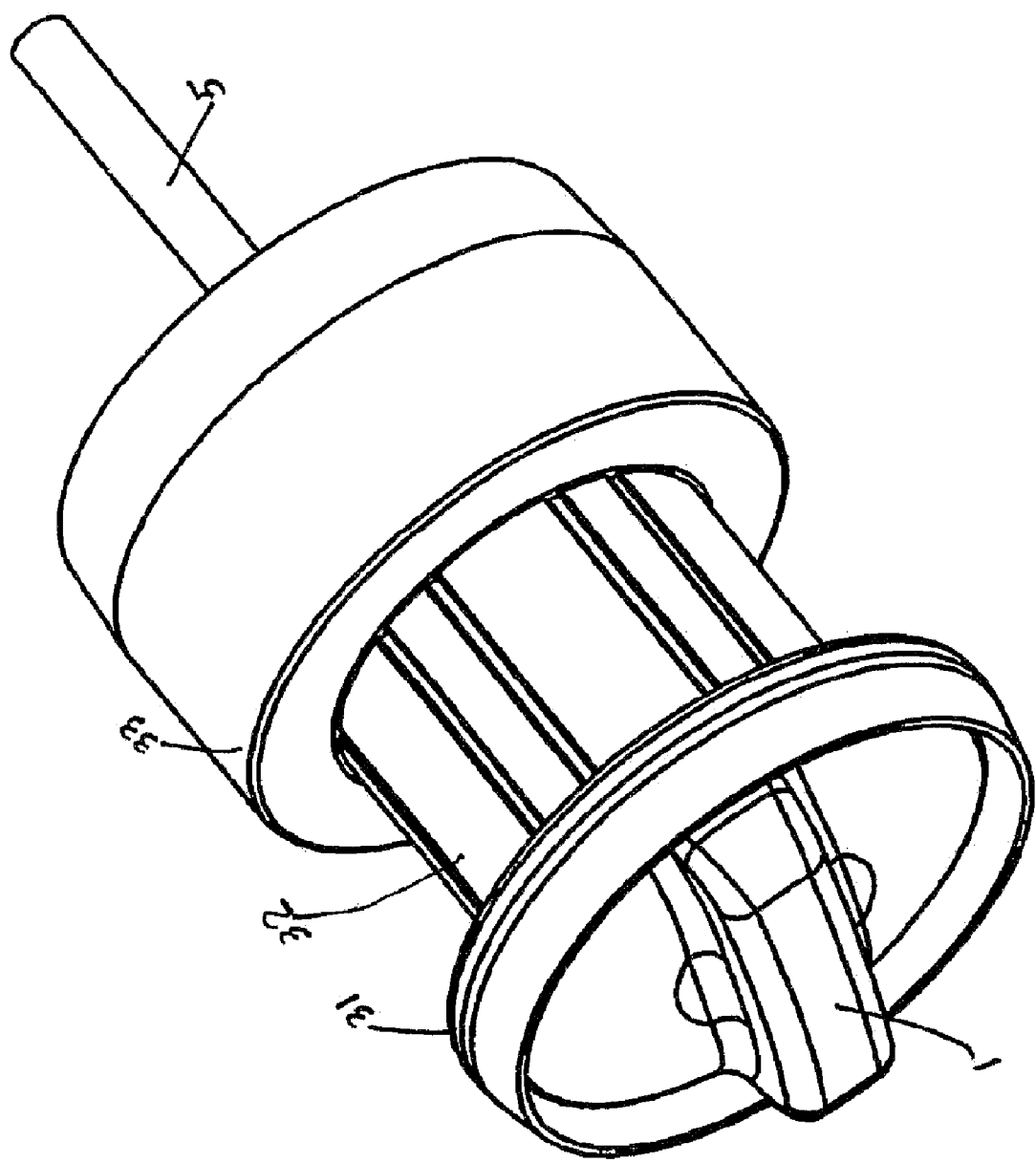
FIG. 3 shows a perspective view of a modularized fishing reel spool according to the best mode of the invention.
Figure 4:
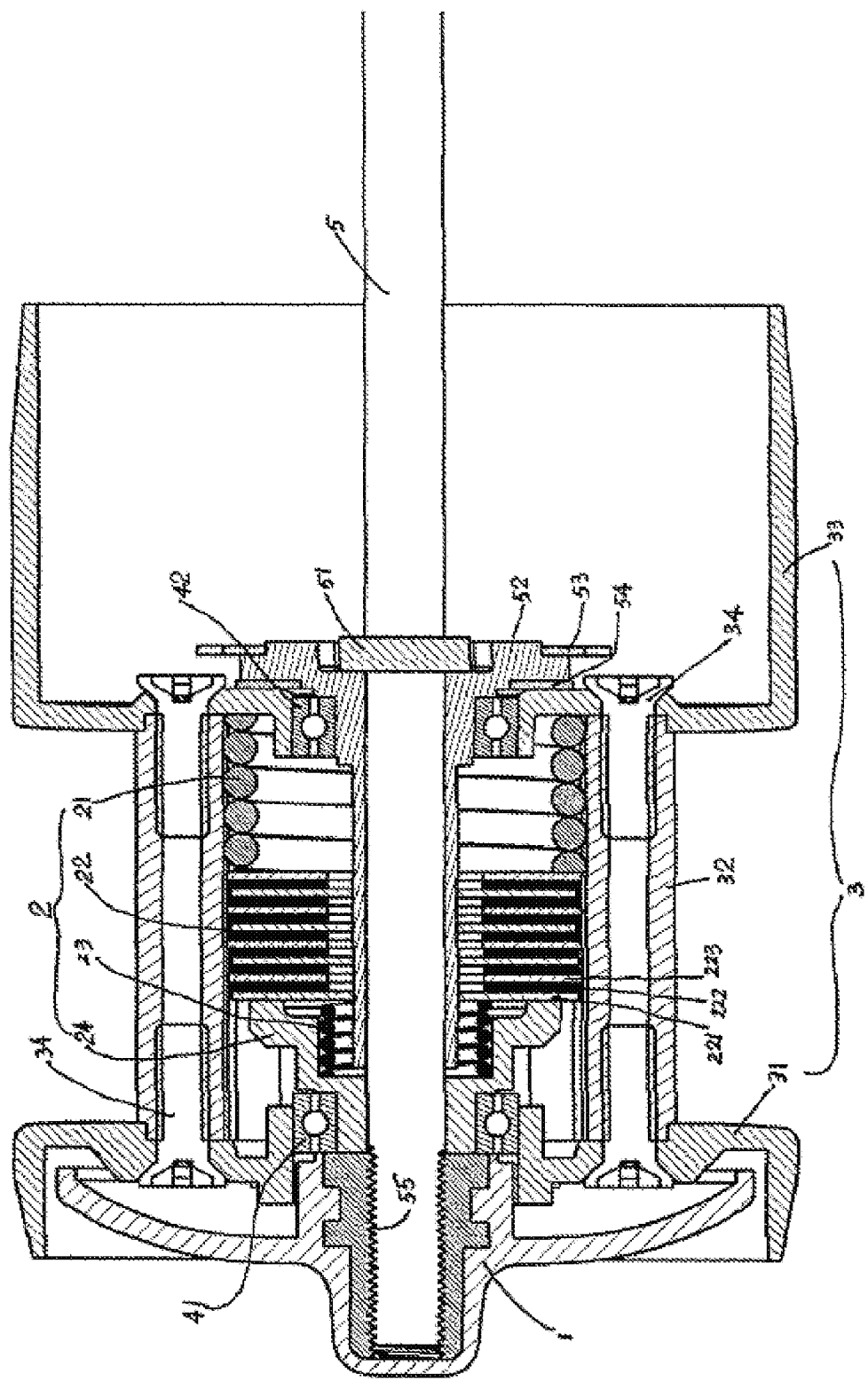
FIG. 4 shows a cross-sectional view of a modularized fishing reel spool according to the best mode of the invention.
Figure 5:
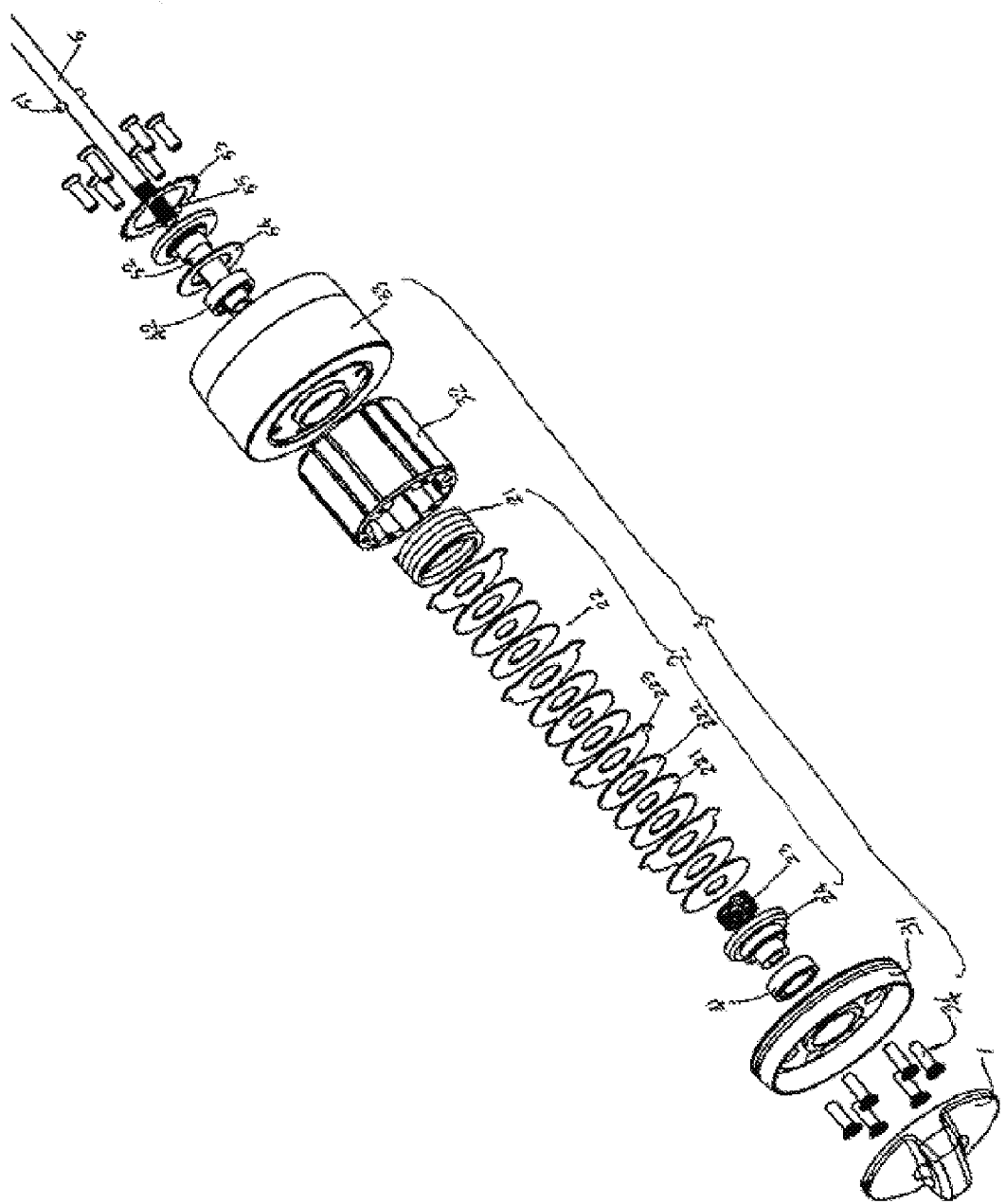
FIG. 5 shows an exploded view of a modularized fishing reel spool according to the best mode of the invention.

FIGS. 4 and 5 illustrate a cross-sectional and an exploded view of a modularized fishing reel spool. The modularized fishing reel spool comprises a drag adjust knob 1, a brake device 2, a spool 3, a turning support device 4, and a main shaft 5.

The spool 3 comprises a front lid 31, a core 32 with a cavity 323, and a skirt 33. These parts are interconnected by means of several connecting elements 34.

A pin 51 is disposed on the main shaft. The front part of the main shaft comprises a thread 55. The main shaft 5 is fitted in the bore 521 of the core shaft 52. The pin 51 is embedded in the key slot 525 located at the flange 524 of the core shaft 52.

The brake device 2 is disposed between the cavity 323 of core 32 and core shaft 52. It is formed by the following parts, counting from back to front: a large spring 21, drag washer stacks 22, a small spring 23, and a front actuator 24. The rigidity of the large spring 21 is larger than that of the small spring 23.

The turning support device comprises a second bearing 42 which sits between the skirt 33 and the flange 523 of core shaft 52, and a first bearing 41 which sits between the front lid 31 and the front actuator 24. This structure keeps the spool in constant support as a freely supported beam.

The main shaft 5 passes through the core shaft 52, the brake device 2, and the turning support device 4. Through the central thread of main shaft 5, the drag adjust knob 1 screws on the thread 55 of the main shaft 5. The drag adjust knob 1 presses upon the front actuator 24.

Figure 6:
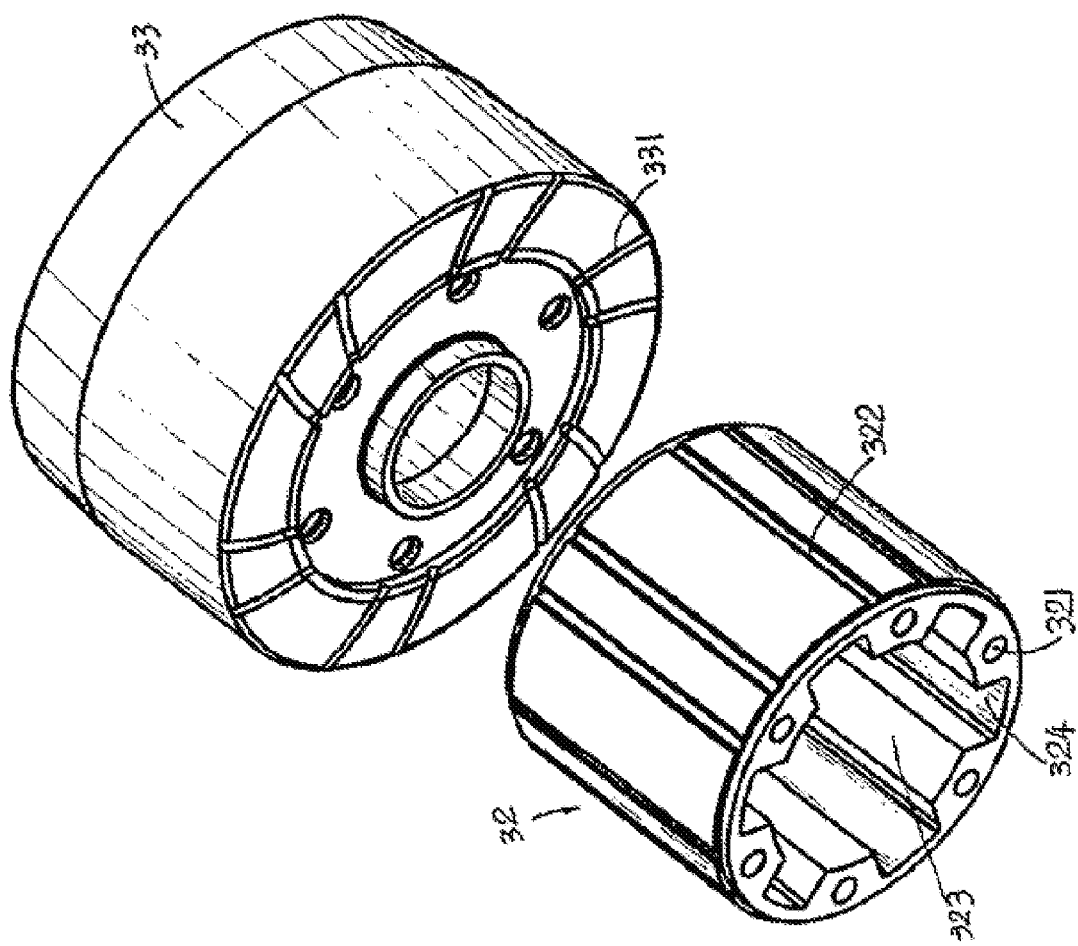
FIG. 6 shows a perspective view of the core and skirt according to one embodiment of the invention.
Figure 7:
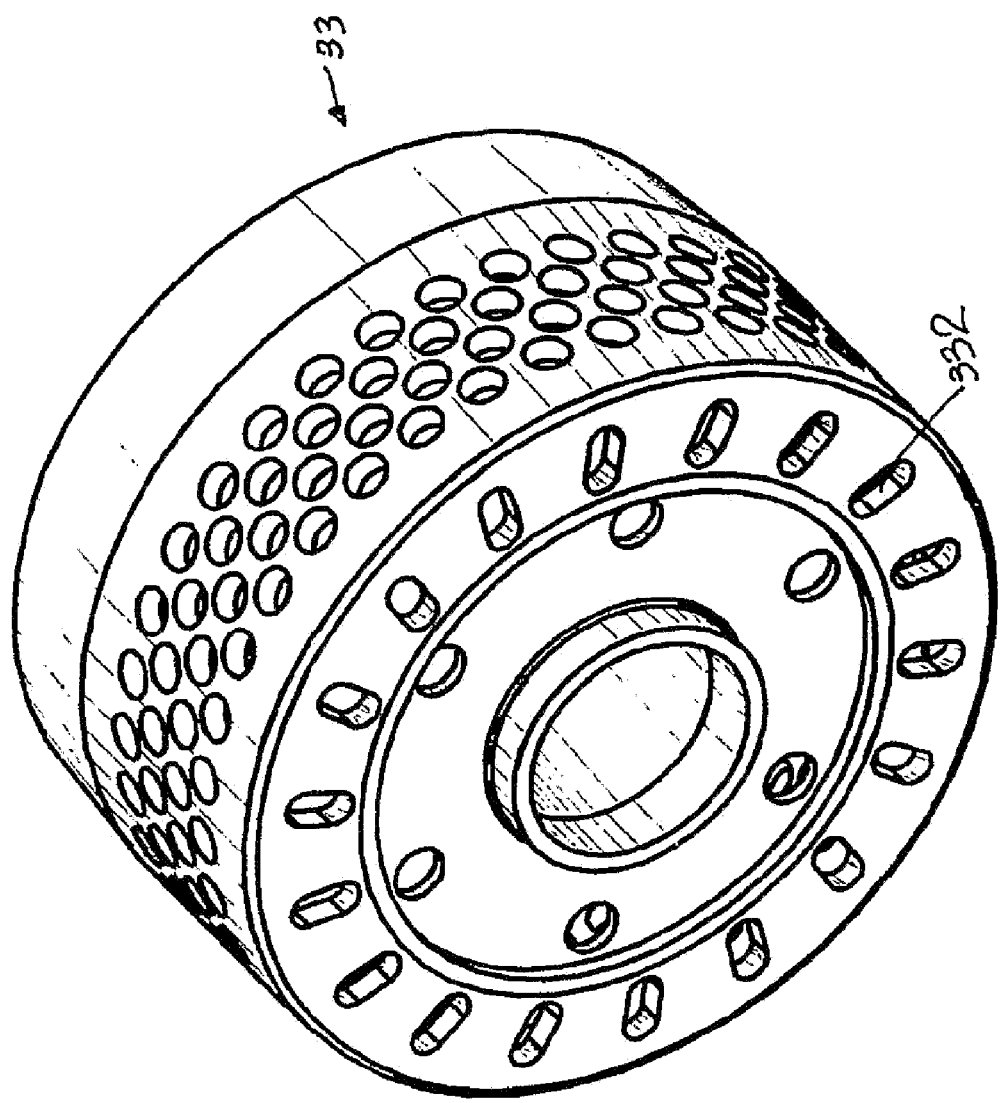
FIG. 7 shows a modularized fishing reel spool according to another embodiment of the invention.

As shown in FIG. 6, at the outside surface of core 32, disposed is more than one elongated water drainer 322. At the end of the skirt 33, disposed are several water drainers 331 for draining off water. Referring to FIG. 7, at the end of the skirt, there can be several holes 332 instead of water drainers 331. There are spline slots 324 on the internal wall of the cavity 323 inside the core 32.

Figure 8:
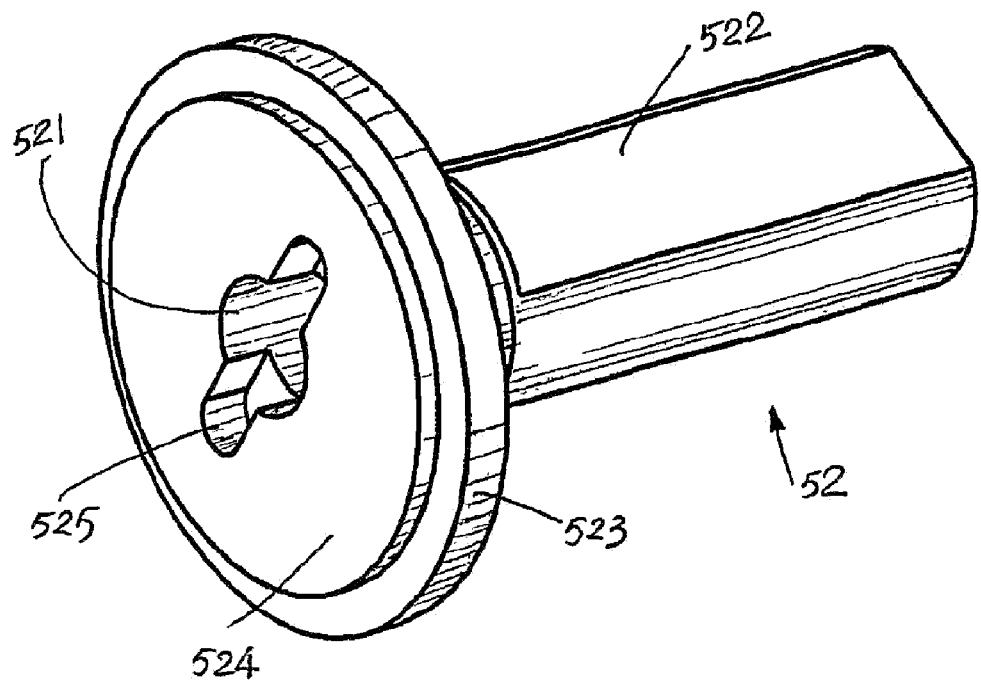
FIG. 8 shows a perspective view of the core shaft of the modularized fishing reel spool according to one embodiment of the invention.

As shown in FIG. 8, the core shaft 52 has a bore 521. The shape of the core shaft 52 is a symmetrical polygon 522, such as a square or a rectangle. The back part of the core shaft 52 comprises a flange 523 and a flange 524. There is a pair of symmetrical key slots 525 located at the junction area between the back side of the flange 524 and the bore 521.

The drag washer stacks 22 comprise a repeating arrangement of a keyed washer 221, a drag washer 222, an eared washer 223, a drag washer 222, a keyed washer 221, and so on. The central hole of the keyed washer 221 sits on the symmetrical polygon 522 without rotating with respect to the core shaft 52. The central holes of the drag washer 222 and the eared washer 223 are round in shape and their diameters are larger than the maximum diameter of the outside section of the core shaft. The ears of the eared washer are embedded into the key slots disposed at the inside diameter of the core 32.

A shim 54 is disposed between the flange 524 of core shaft 52 and the skirt 33.

The back part of the flange 524 comprises a sound ratchet 53.

Compared to conventional fishing reel spools, this invention features the following advantages.

Figure 9:
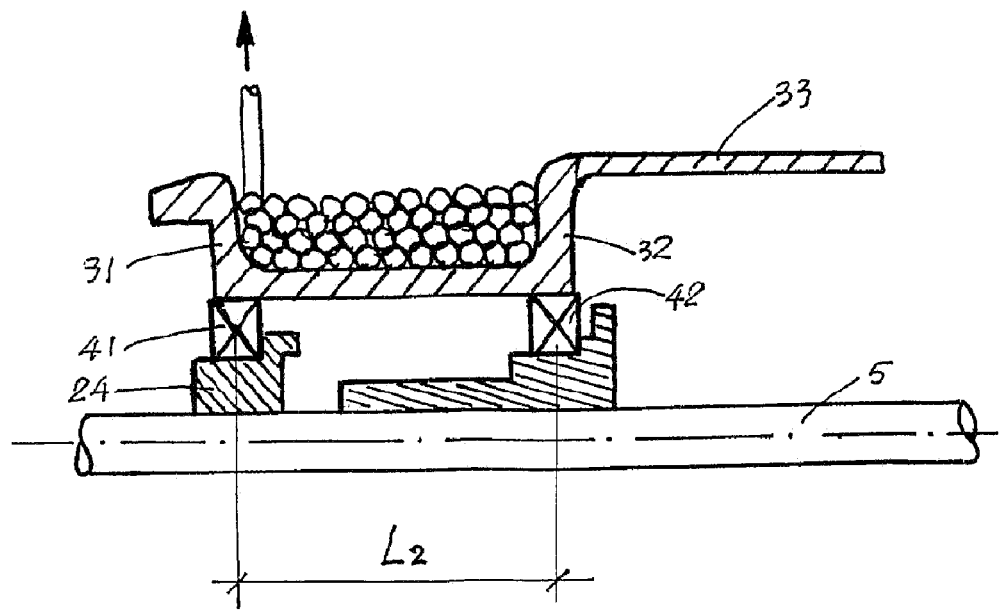
FIG. 9 shows a schematic view of a turning support structure of the spool according to one embodiment of the invention.

The turning support device keeps the spool constantly supported as a freely supported beam. As shown in FIG. 9, the width of the bearing support structure is the distance L2, which is much larger than the width of the conventional reel bearing support structure L1. The two bearing structure minimize the resistance during line release. This means that the reel of the invention can achieve maximum releasing efficiency.

The brake mechanism of this invention employs two springs. The rigidity of the small spring 23 is smaller than the rigidity of the large spring 21. The brake force of the reel according to the invention is controlled by turning the drag adjust knob 1 with thread 55 on the main shaft 5.

Before the drag adjust knob 1 compresses the small spring 23 and large spring 21, the spool 3 including the core 32, and the skirt 33 can rotate freely relative to main shaft 5; the drag resistance is nearly zero. When the drag adjust knob 1 is continuously screwed in, it will, through front actuator 24, compress the small spring 23. Due to the fact that the rigidity of the small spring 23 is smaller than that of the large spring 21, only the small spring is compressed initially. The brake force mainly acts small spring 23. Further turning of the drag adjust knob 1 causes the front actuator 24 to touch the adjacent keyed washer 221. The front actuator 24 is then unable to compress the small spring 23 any further. As a result, through the drag washer stacks 22, the force of drag adjust knob 1 starts to compress the large spring 21. The brake force in this period is determined by a combined property of the small spring 23 and large spring 21. The conclusion is the adjustable range of this invention is much wider than in conventional reels and the brake force can be controlled in separated stages.

The spool 3 comprises a front lid 31, a core 32, and a skirt 33. These parts are connected by mans of connecting element 34 and/or thread. The core 32 can be manufactured from a drawn pipe. The skirt 33 and front lid 31 can be punch pressed or drawn to form their shape with little machining required; therefore the manufacturing and material costs are relatively low.

The spool 3, the skirt 33, and the core 32 of the reel according to this invention comprise water drainer slots and/or water drainer holes, which effectively improve the function of the fishing reel and make it more convenient to use.

What is claimed is:

1. A fishing reel, comprising
a drag adjust knob (1),
a brake device (2),
a spool (3),
a turning support device (4), and
a main shaft (5), wherein
said spool (3) comprises a front lid (31), a core (32) having a cavity (323), and a skirt (33); said front lid (31), said core (32) and said skirt (33) being connected by a connecting element (34);
a pin (51) is disposed on the main shaft (5);
a front portion of the main shaft (5) is threaded (55),
the main shaft (5) is set in a bore (521) on a core shaft (52),
the pin (51) is embedded in a key slot (525) on a flange (524) of the core shaft (52);
the brake device (2) disposed in the middle of the cavity (323) between the core shaft (52) and core (32) comprises a large spring (21), a drag washer stack (22), a small spring (23) and a front actuator (24);
the rigidity of the small spring (23) is smaller than the rigidity of the larger spring (21);
the turning support device (4) comprises a second bearing (42) disposed between the skirt (33) and the core shaft (52), and a first bearing (41) disposed between the front lid (31) and the front actuator (24);
the turning support device (4) keeps the spool constantly supported as a freely supported beam;
the main shaft passes through the core shaft (52), brake device (2) and turning support device (4);
the central thread of the drag adjust knob (1) screws on the thread (55) of the main shaft (5); and
the drag adjust knob (1) then presses upon the front actuator (24).

2. The reel of claim 1 wherein the connecting element (34) is a screw.

3. The reel of claim 1 wherein the front lid (31) and the core (32) are connected by a thread, and the skirt (33) and the core (32) are connected by thread.

4. The reel of claim 1 wherein more than one elongated water drainers (322) are disposed on the outside of the core (32).

5. The reel of claim 1 wherein more than one water drainers (331) and/or through holes (332) are disposed at the end of the skirt (33).

6. The reel of claim 5 wherein
the core shaft (52) has a bore (521),
the core shaft (52) is a symmetrical polygon (522),
the back portion of the core shaft (52) expands to a first flange (523) and a second flange (524), and
a pair of symmetrical key slots (525) is disposed at a connecting area between the back side of the second flange (524) and bore (521).

7. The reel of claim 6 wherein,
a drag washer stack (22) comprises a keyed washer (221), a drag washer (222), an eared washer (223), a drag washer (222) and a keyed washer (221), the central hole of the keyed washer (221) is a spline connected with the core shaft (52) to form a non-rotating link;
the center holes of eared washer (223) and drag washer (222) are round and the diameters of the holes are larger than the maximum diameter of polygonal section of the core shaft (52); and
the ears of the eared washer (223) are embedded into the spline slots (324) inside of the core (32).

8. The reel of claim 1 wherein a plurality of spline slots (324) are disposed axially on the cavity (323) inside of the core (32).

9. The reel of claim 1 wherein,
a drag washer stack (22) comprises a keyed washer (221), a drag washer (222), an eared washer (223), a drag washer (222) and a keyed washer (221),
the central hole of the keyed washer (221) is a spline connected with the core shaft (52) to form a non-rotating link;
the center holes of eared washer (223) and drag washer (222) are round and the diameters of the holes are larger than the maximum diameter of polygonal section of the core shaft (52); and
the ears of the eared washer (223) are embedded into the spline slots (324) inside of the core (32).

10. The reel of claim 1 wherein, a shim (54) is disposed between the skirt (33) and the flange (524) of core shaft (52).

11. The reel of claim 1 wherein, a sound ratchet (53) is disposed at the flange (524).

* * * * *